United States Patent
Maliszewski

(10) Patent No.: US 7,140,005 B2
(45) Date of Patent: Nov. 21, 2006

(54) METHOD AND APPARATUS TO TEST AN INSTRUCTION SEQUENCE

(75) Inventor: Richard L. Maliszewski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 09/764,725

(22) Filed: Jan. 17, 2001

(65) Prior Publication Data

US 2001/0027383 A1  Oct. 4, 2001

Related U.S. Application Data

(63) Continuation of application No. 09/217,498, filed on Dec. 21, 1998, now abandoned.

(51) Int. Cl.
 G06F 12/14 (2006.01)
 G06F 21/22 (2006.01)

(52) U.S. Cl. .............. 717/126; 713/190; 713/194; 726/27

(58) Field of Classification Search ........... 717/130, 717/124, 126, 127, 131; 713/187, 188, 189, 713/190, 193, 194
 See application file for complete search history.

(56) References Cited

U.S. PATENT DOCUMENTS

| | | | | |
|---|---|---|---|---|
| 4,951,249 A * | 8/1990 | McClung et al. | ........... | 713/202 |
| 5,134,701 A * | 7/1992 | Mueller et al. | ............... | 703/22 |
| 5,313,616 A * | 5/1994 | Cline et al. | ................. | 717/127 |
| 5,335,344 A * | 8/1994 | Hastings | ...................... | 714/35 |
| 5,386,471 A * | 1/1995 | Bianco | ........................ | 713/162 |
| 5,483,649 A * | 1/1996 | Kuznetsov et al. | ......... | 713/200 |
| 5,495,612 A * | 2/1996 | Hirayama et al. | .......... | 719/331 |
| 5,574,854 A * | 11/1996 | Blake et al. | .................. | 714/28 |
| 5,603,045 A * | 2/1997 | Dockser | ..................... | 712/233 |
| 5,604,895 A * | 2/1997 | Raimi | ........................ | 703/13 |
| 5,710,724 A * | 1/1998 | Burrows | ...................... | 714/34 |
| 5,721,945 A * | 2/1998 | Mills et al. | .................. | 712/35 |
| 5,852,729 A * | 12/1998 | Limberis et al. | ............ | 712/225 |
| 5,933,640 A * | 8/1999 | Dion | .......................... | 717/132 |
| 5,966,541 A * | 10/1999 | Agarwal | ..................... | 717/132 |
| 6,006,328 A * | 12/1999 | Drake | ........................ | 713/200 |
| 6,141,698 A * | 10/2000 | Krishnan et al. | ........... | 719/331 |
| 6,266,416 B1 * | 7/2001 | Sigbj.ørnsen et al. | ....... | 380/255 |
| 6,665,797 B1 * | 12/2003 | Keung | ........................ | 713/193 |

FOREIGN PATENT DOCUMENTS

WO  WO 9704394 A1 *  2/1997

\* cited by examiner

*Primary Examiner*—Tuan Dam
*Assistant Examiner*—Eric B. Kiss
(74) *Attorney, Agent, or Firm*—Blakely, Sokoloff, Taylor & Zafman LLP

(57) ABSTRACT

A data processing device associates a test module with a sequence of instructions, the test module producing a test result by performing a test on a sequence of instructions. In the sequence of instructions, a first instruction comprising a target address is replaced with a second instruction having an instruction address in the sequence, the second instruction to transfer control to the test module. The target address is stored within an encrypted table, and the test module locates the target address in the table and transfers control to the target address when the test result indicates the sequence of instructions may proceed.

13 Claims, 7 Drawing Sheets

Machine-Readable Storage Medium

Binary Post-Processing Instructions

Instruction to identify instruction in instruction sequence to replace  420

Instructions to replace identified instructions with instructions to transfer control to test module  430

Instructions to generate target address table  440

Instructions to compact instruction sequence and adjust address reference in instruction sequence and target address table  450

Instructions to associate test module with instruction sequence  460

Instructions to encrypt target address table into test module  470

METHOD AND APPARATUS TO TEST AN INSTRUCTION SEQUENCE

This is a continuation of application Ser. No. 09/217,498, filed Dec. 21, 1998, and now abandoned.

BACKGROUND

1. Field

The present invention relates to software test sequences and, more particularly, to post-compilation software test sequences.

2. Background Information

The proliferation of software piracy, viruses, and hacking has created a need for secure mechanisms for testing instruction sequences and preserving their integrity.

One approach employed by existing virus scanning programs is to test the instruction sequence each time the instruction sequence is loaded for execution. The test takes the form of a verification of the sequence to confirm that the sequence has not been altered. An encrypted hash value is appended to the instruction sequence and each time the sequence is loaded for execution, a hash value is computed on the sequence and compared with the encrypted hash value. If the values match, the sequence is verified and permitted to execute. A disadvantage of this approach is that it employs a separate program to test the sequence. This separate program may be installed on each data processing device which executes the sequence, or else the sequence will be untested in some environments. Another disadvantage of this approach is that once the sequence is loaded in memory, a third party may modify the sequence in memory and alter its intended execution. Testing is performed only at load time, so that execution-time modifications are not detected. For example, third parties might load a game program with a registration checker, and then bypass the registration checker by modifying the game instruction sequence in memory after it has been loaded.

Some schemes for protecting instruction sequences involve the entire sequence encrypted with a key. Only special programs with an associated key may decrypt the program for loading in this approach. These schemes suffer from similar drawbacks as the prior art virus checker discussed above—each data processing device on which the sequence runs includes the special loading program, and once the sequence is in memory, it may be subject to alteration.

Other testing schemes cause control of the sequence of instructions to be transferred to a test module during execution of the sequence, the test module to perform a test on the sequence (for example, to test the integrity of the instructions in the sequence for alterations). A disadvantage of this approach is that it may be relatively simple for a third party to modify the instruction sequence in memory to bypass the test module. It would be desirable to implement a scheme in which it would be difficult for a third party to bypass the test module.

Still other testing schemes involve access to the source code of the sequence to be tested, to determine points at which the test module may be invoked. It may not always be possible to access source code, especially when the sequence to test is not created by the same party performing the test.

SUMMARY

A data processing device associates a test module with a sequence of instructions, the test module producing a test result by performing a test on a sequence of instructions. In the sequence of instructions, a first instruction comprising a target address is replaced with a second instruction having an instruction address in the sequence, the second instruction to transfer control to the test module. The target address is stored within an encrypted table, and the test module locates the target address in the table and transfers control to the target address when the test result indicates the sequence of instructions may proceed.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

FIG. 4 is a schematic diagram illustrating an embodiment of a machine-readable medium having instructions that when executed implements a method to post-process a sequence of instructions in accordance with the present invention.

DETAILED DESCRIPTION

Figure 1A:
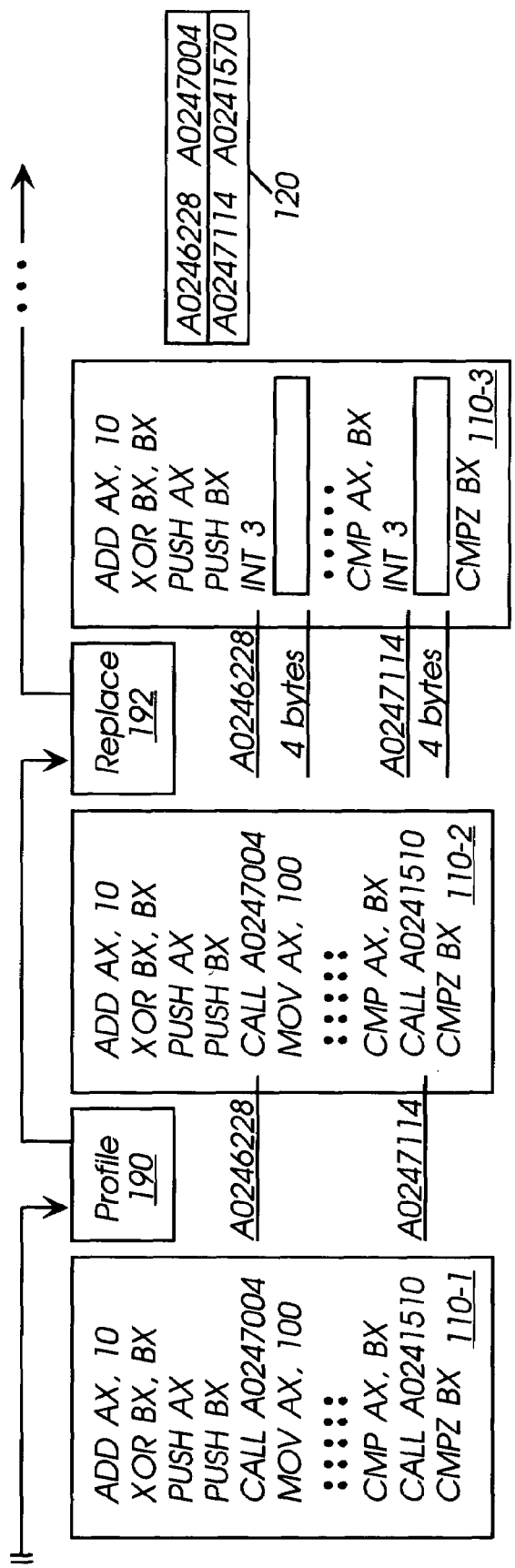
FIG. 1A is a schematic diagram illustrating an embodiment of stages of a method to post-process a sequence of instructions in accordance with the present invention.

The present invention comprises an embodiment of a binary instruction sequence postprocessor and/or components thereof. The embodiments described herein enable the testing of binary instruction sequences with several advantages over existing implementations. For example, some embodiments may be implemented to test a binary instruction sequence at run-time without the use of special-purpose program loaders. The embodiments described herein are merely illustrative, and one skilled in the art will appreciate that numerous modifications can be made which nonetheless fall within the scope of the present invention.

The term binary post-processor refers to a software program or other executable software sequence which modifies a sequence of compiled software instructions. For example, a program which scans a computer game file and replaces certain instructions with other instructions may be a binary post-processor. The instructions to replace may be identified by profiling the binary sequence of instructions. Profiling is a process, well-known in the art of computer software design, by which the sequence of instructions is executed under conditions in which the number of procedure calls (also known as function calls) and the time spent within each procedure (function) may be closely monitored. Procedure calls may be invoked, for example, using a CALL instruction on some computer systems. Other computer systems may use an instruction of another name, but with similar purpose (e.g. to invoke a function or procedure), and it should be understood that reference in this specification to CALL instructions are merely illustrative of any instruction to invoke a function or procedure.

In one embodiment, CALL instructions at points in the sequence of instructions identified through profiling are replaced with INT instructions to transfer control from the sequence of instructions to a test module. The INT instruction is one example of an instruction which can be used to transfer control from one sequence of instructions to another (in this example, from the sequence of instructions to test to the test module). Other embodiments may employ other instructions for this purpose, and the invention is not limited to the use of INT instructions in this regard.

The test module may perform any type of desired test. In one embodiment, the test module may perform an integrity check on the sequence of instructions to ensure that a hacker or other third party has not modified the sequence in any way from its desired form. Once the test is complete, the test module may invoke the procedure or function which would have been called at that point in the instruction sequence had the test module not been invoked instead.

In one embodiment, an entry is made in a target address table indicating the target address comprised by each replaced CALL instruction. The target address is the address of the instruction to which the replaced CALL instruction would have transferred control had it been executed in sequence. In this embodiment, a corresponding entry in the table indicates the address of the INT instruction replacing the CALL instruction. The INT instruction address is the address from which control was transferred to the test module. The target address is the address to which control may be transferred after the test is performed.

In one embodiment, the sequence of instructions is compacted after the CALL instructions are replaced. Compaction may occur because the INT instructions may comprise fewer bytes than the replaced CALL instructions. Compaction of the instruction sequence may involve adjustments to address values in the instruction sequence and in the target address table.

The target address table, which in some embodiments may be comprised by the test module, may be encrypted to reduce the risk of identification of the target addresses by third parties who may inspect the target address table in an attempt to bypass the test module. The test module may be associated with the instruction sequence so that it may be loaded and executed automatically when the sequence is loaded and executed.

FIG. 1A is a schematic diagram illustrating stages of an embodiment of a method of instruction sequence post-processing in accordance with the present invention. Referring now to FIG. 1A, a binary instruction sequence 110-1 may be profiled by a profile stage 190 to identify locations in the instruction sequence at which to transfer control to a test module 180. In one embodiment, profiling may be performed upon the instruction sequence 110-1 once the sequence has been compiled and linked into a binary executable program. In this embodiment, profiling may not require reference to the source code for the sequence 110-1. Profiling may identify locations in the instruction sequence 110-1 such that control may be transferred to the test module 180 (shown in FIG. 1C) repeatedly, but without substantial detriment to the performance of the sequence 110-1.

In this example, two CALL instructions are identified as test points. The addresses of the CALL instructions, shown in the sequence 110-2 are A0246228 and A0247114. The CALL instructions may be replaced by INT instructions at a replacement stage 192. The INT instruction comprises four fewer bytes than the CALL instruction, and hence a four byte "hole" is created in the sequence 110-3 at each point of replacement. This four byte hole may be filled, for example, with NOP instructions. For each CALL replacement, an entry may be made in a target address table 120. The entry comprises the target address comprised by the replaced CALL instruction (right-hand side of table), with a corresponding entry for the address of the INT instruction which replaced the CALL instruction (left-hand side of table). In this example, the INT instruction at address A0246228 replaced the CALL instruction comprising target address A0247004. The INT instruction at address A0247114 replaced the CALL instruction comprising target address A02471570.

Figure 1B:
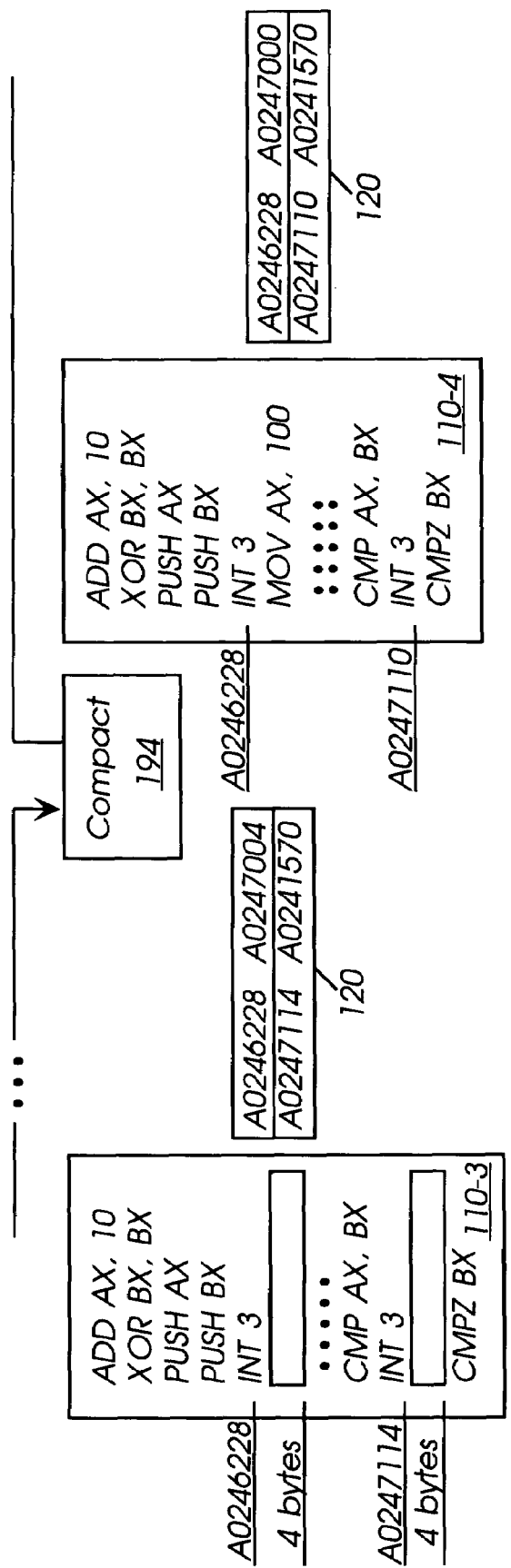
FIG. 1B is a schematic diagram illustrating additional stages of an embodiment of a method to post-process a sequence of instructions in accordance with the present invention.
Figure 1C:
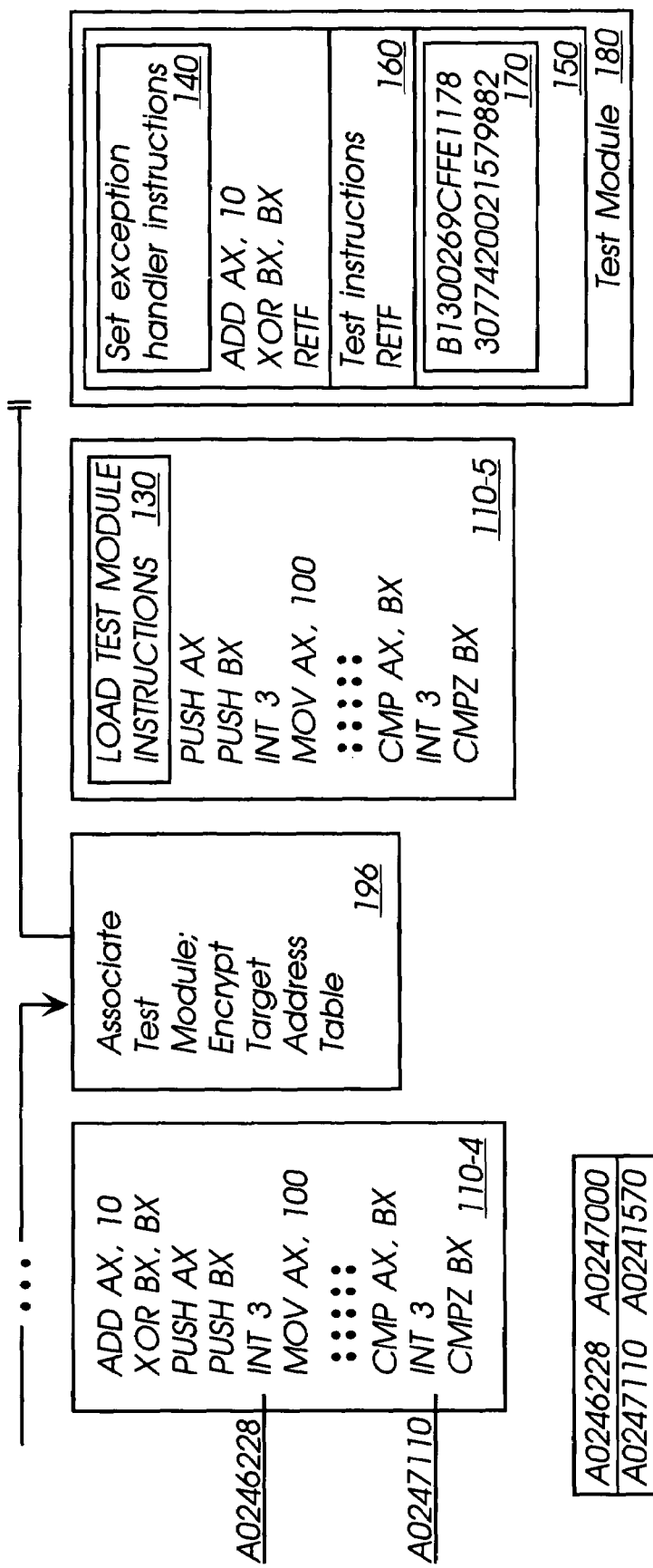
FIG. 1C is a schematic diagram illustrating additional stages of an embodiment of a method to post-process a sequence of instructions in accordance with the present invention.

Referring momentarily to FIG. 1C, in this embodiment the INT instructions may invoke a structured exception handler (not shown) which in turn will invoke the test instructions 160 of the test module 180. The structured exception handler should not be confused with the instructions to set the exception handler 140. The instructions to set the exception handler 140 are typically executed only once, to cause a particular interrupt type to transfer control to the structured exception handler each time the interrupt type occurs. Structured exception handlers are well-known in the art and typically comprise small sequences of instructions to receive control when software interrupts occur. In one embodiment, the exception handler receives control when an interrupt occurs and transfers control to the test module. Structured exception handlers may be comprised by the test module 180 or may comprise entirely separate sequences of instructions. Structured exception handlers are an implementation detail to which the invention is in no way limited.

Referring now to FIG. 1B, the sequence 110-3 may be compacted at a compaction stage 194 to remove the "holes" created by the replacement. The "holes" may be created because the replaced CALL instruction may be several bytes larger than the INT instruction which replaces it. The "hole" may comprise NOP instructions in some embodiments. During compaction, the instructions subsequent to a replaced instruction may be shifted upward in address to remove the "holes". Addresses comprised by the moved instructions, or instructions which reference the moved instructions, may involve adjustments to account for the movement of the instructions. In this example, in sequence 110-4, the second INT instruction at address A0247114 is moved to A0247110 (four bytes) to fill in the hole subsequent to the INT instruction at address A0246228. Likewise, in the target address table 120 the target address for the replaced CALL instruction at address A0246228 is adjusted from A0247004 to A0247000 (four bytes) to account for the fact that the target address is subsequent to the first INT instruction but precedent to the second INT instruction.

Compaction may add security to the sequence 110-4 because a third party attempting to "undo" the replacement may have to first determine the target address corresponding to the replaced CALL instruction (the target address being encrypted in the table 170) and further, should the third party determine the target address, they may be required to expand the instruction sequence 110-4 to make room for the larger CALL instruction upon "undoing" the replacement.

Referring now to FIG. 1C, a test module 180 may be associated with the sequence 110-4 at stage 196. A sub-sequence of instructions, in this example comprising the instructions ADD AX, 10 and XOR BX,BX is extracted from the sequence 110-4 and in its place a sequence of instructions 130 to load the test module 180 is inserted into the sequence 110-5. In one embodiment, the test module 180 may comprise a Dynamic Link Library (DLL) which may be loaded by the sequence 110-5 at run time. The load instructions 130 may be inserted at a location in the sequence 110-5 such that they may be assured to execute. The extracted sub-sequence of instructions may be moved into the test module 180. In this example, the extracted sub-sequence may be inserted into the test module 180 in an initialization routine 150 which may be called when the test module 180 is loaded. The extracted sub-sequence may be executed by the test module 180 subsequent to execution of instructions 140 to set an exception handler. Once the instructions 140 are executed to set the exception handler, execution of an INT instruction by the sequence 110-5 may cause control to be transferred to the test instructions 160 by way of the exception handler (not shown). The target address table 120 may be encrypted into an encrypted table 170 and inserted into the test module 180. In one embodiment, the test module 180 retains information (such as a key) on how to access the decrypted information within the encrypted table 170. Many encryption techniques well-known in the art may be employed for this purpose, and the invention is not limited to any particular encryption technique.

In other embodiments, it may be possible to modify a data area (for example, a program header) of the sequence 110-5 in order to instruct a program loader to load the test module 180 each time the sequence 110-5 is loaded. This may be possible, for example, on a Microsoft Windows™ operating systems in which the program loader consults a data area of programs to load to determine one or more DLL's to load along with the program.

Of course, the preceding descriptions and examples used in conjunction with FIG. 1A–FIG. 1C are merely illustrative, and the invention is not limited in scope to these particular embodiments or examples.

In one embodiment, the test performed on the instruction sequence 110-5 comprises an integrity check. An integrity check may be performed by computing a hash value on the sequence 110-5 and then encrypting the hash value with a private key. In one embodiment this may involve the well-known Digital Signature Standard (DSS) specified by National Institute of Standards and Technology Federal Information Processing Standard 186 (May 1994). To check the integrity of the sequence 110-5, the test module 180 may compute a hash value on the sequence 110-5 and apply a public key to the encrypted hash. If the encrypted value and the computed value of the hash match, the sequence 110-5 is verified. In addition or in place of integrity checks, other security checks may be performed on the sequence 110-5 by the test module 180. For example, the test instructions 160 may test to determine if the sequence 110-5 is executing on an identified processor. The processor identification for which the sequence is authorized to execute upon is encrypted using a private key, and the test instructions 160 decrypt the processor identification and compare it with an identification for the processor upon which the sequence is actually executing. If the identifications match, execution of the sequence is authorized.

In one embodiment, invoking the target address corresponding to the address from which the test module 180 was invoked involves simulating the function call corresponding to the replaced CALL instruction. Many techniques well-known in the art are available for simulating function calls. One such technique is to restore the execution stack to its state prior to execution of the INT instruction, restore the values of all registers prior to the INT instruction, and set the instruction pointer (IP) to the value of the target address. Other techniques for invoking the target address on numerous hardware and software platforms may be possible within the scope of the invention.

Figure 2:
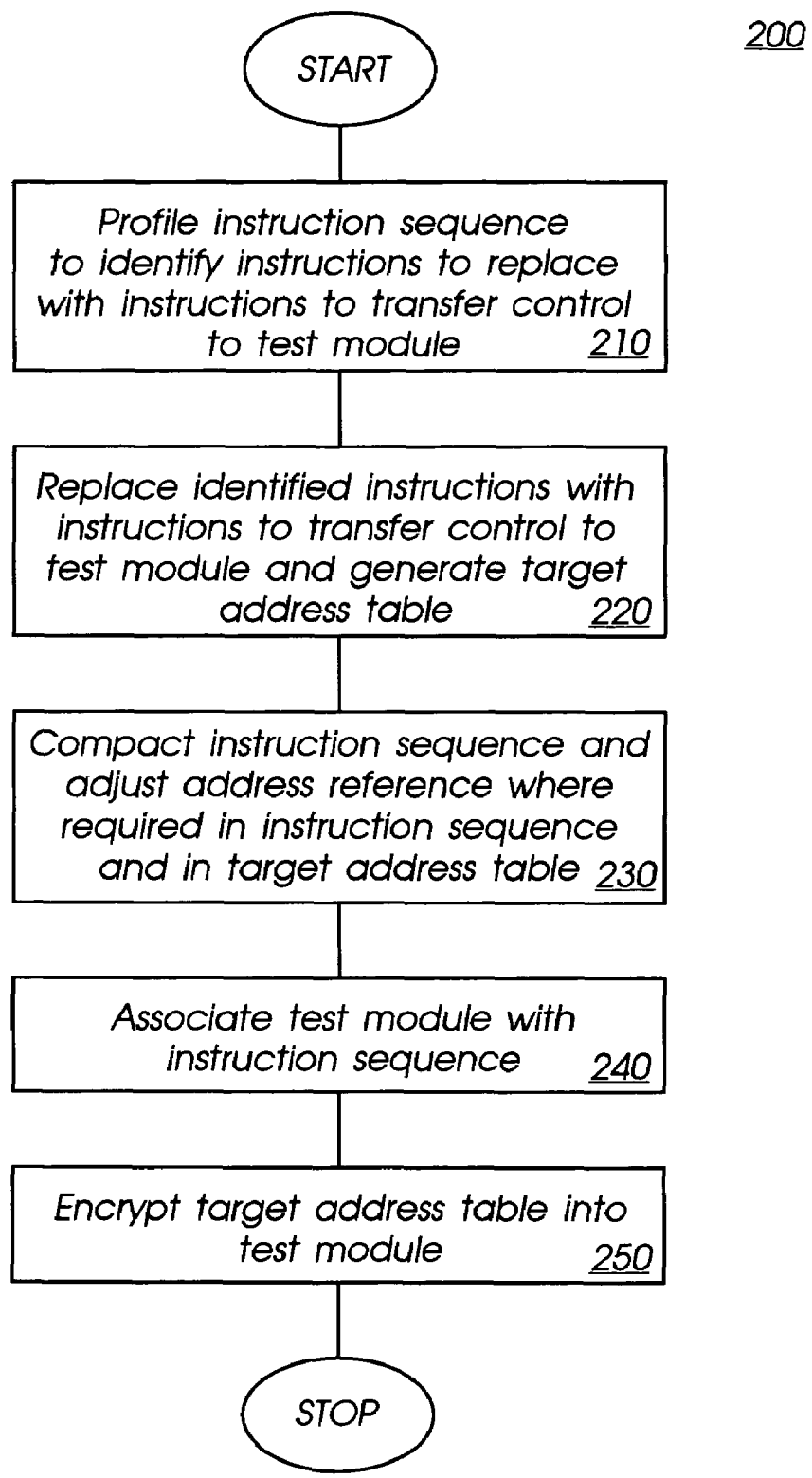
FIG. 2 is a flowchart illustrating one embodiment of a method to post-process a sequence of instructions in accordance with the present invention.

FIG. 2 is a flowchart illustrating one embodiment 200 of a method to post-process a sequence of instructions in accordance with the present invention. Referring now to FIG. 2, at 210 the instruction sequence to test is profiled to identify instructions to be replaced by instructions to transfer control to the test module. At 220 the identified instructions are replaced with instructions to transfer control to the test module. Also at 220, during replacement of the identified instructions, a target address table is generated. The instruction sequence to test may be compacted at 230 to remove the "holes" resulting from replacement, and addresses in the instruction sequence to test and in the target address table may be adjusted to account for the relocation of instructions during compaction. The test module may be associated with the instruction sequence to test at 240, so that when the instruction sequence to test is loaded and executed, the test module may also be loaded. At 250, the target address table may be encrypted and inserted into the test module.

The test module and target address table may comprise but are not limited to any of the possible embodiments described with respect to FIG. 1. For example, in one embodiment the test module comprises an initialization section including instructions to set a structured exception handler and instructions relocated from the instruction sequence to test.

One skilled in the art will appreciate that the method embodiment of FIG. 2 need not occur in the precise order of illustration to remain in accordance with the present invention. For example, in some embodiments the test module may be associated with the instruction sequence to test before the instruction sequence to test is profiled.

Employing the post-processing method embodiment described above may result in the instruction sequences becoming self-testing, so that the intervention of a separate program (such as a virus checker or special-purpose loader) to perform tests such as verification need not be employed. Testing may be performed at intervals during execution of the sequence, so that post-loading modifications may be detected.

The embodiment illustrated by FIG. 2 may render it difficult for a third party to bypass the test module, because the test module may be invoked frequently, the corresponding target address may be obscured by encryption of the table, and replacement of the instruction to invoke the test module with the original instruction may be made more difficult by compaction of the sequence.

Figure 3:
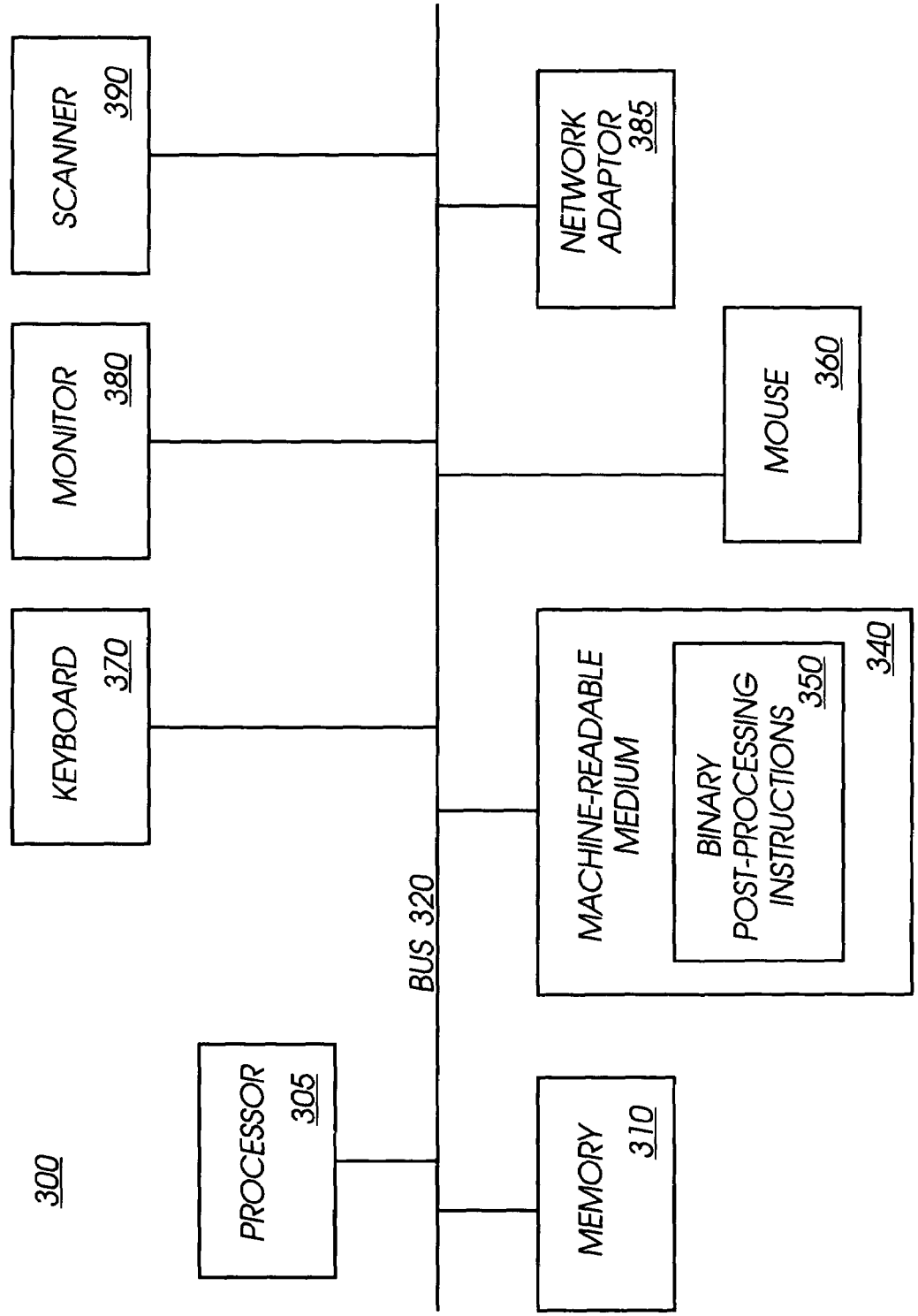
FIG. 3 is a schematic diagram illustrating an embodiment of a data processing device to post-process a sequence of instructions in accordance with the present invention.

FIG. 3 is a schematic diagram illustrating an embodiment 300 of a data processing device to post-process a sequence of instructions in accordance with the present invention. Referring now to FIG. 3, embodiment 300 comprises a processor 305 to execute instructions supplied from a bus 320. The executed instructions are stored in a memory 310 from which they are supplied to the processor 305 by the bus 320 for execution. The processor 305 may be implemented using any semiconductor fabrication technology and may execute any instruction set including, but not limited to, instruction sets supported by an Intel Corporation Pentium® processor or compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including binary post-processing instructions 350, may then be stored in RAM, ROM, or other memory from which instructions may be directly accessed over the bus 320 by the processor 305 for execution.

To perform signal input/output, embodiment 300 may comprise a mouse 360, a keyboard 370, a display 380, and a scanner 390, each coupled to the bus 320 for transmitting data so that it may be easily accessed or manipulated by a user. The embodiment 300 may further include a network adapter 385 to couple the embodiment 300 to a network. Of course, the invention is not limited in scope to this particular embodiment.

In accordance with the present invention, embodiment 300 may comprise binary post-processing instructions 350 stored on the machine-readable storage medium 340. The binary post-processing instructions may include sequences of instructions for performing the method embodiment illustrated in FIG. 2. These instruction sequences are further illustrated in FIG. 4. Of course, the invention is not limited in scope to this particular embodiment.

FIG. 4 is a schematic diagram illustrating an embodiment of a machine-readable medium 400 comprising an embodiment of a sequence of binary post-processing instructions 410 to associate a test module with a sequence of instructions in accordance with the present invention. Referring now to FIG. 4, the machine-readable storage medium 400 may comprise RAM, ROM, a floppy disk, and hard disk, a CD ROM, or any other memory capable of storing sequences of instructions which may be executed by a data processing device such as, for example, the device embodiment illustrated in FIG. 3. In this particular embodiment, the sequences of instructions may comprise sequences of instructions to carry out the method embodiment of FIG. 2, including but not limited to: instructions 420 to identify instructions in the instruction sequence to replace; instructions 430 to replace the identified instructions with instructions to transfer control to a test module; instructions 440 to generate a target address table; instructions 450 to compact the instruction sequence to test and to adjust address references in the sequence and in the target address table which are affected by the compaction; instructions 460 to associate the test module with the instruction sequence to test; and instructions 470 to encrypt the target address table and insert the encrypted table into the test module.

Of course, the invention is not limited in scope to this particular embodiment. For example, alternate embodiments could include additional sequences of instructions for performing other functions different from or supplementing the binary post processing instructions 410.

The manners of producing the machine-readable storage medium 400 storing sequences of instructions, such as binary post-processing instructions 410, are well-known in the art and to elaborate in detail would merely obscure the description of the present invention.

Figure 5:
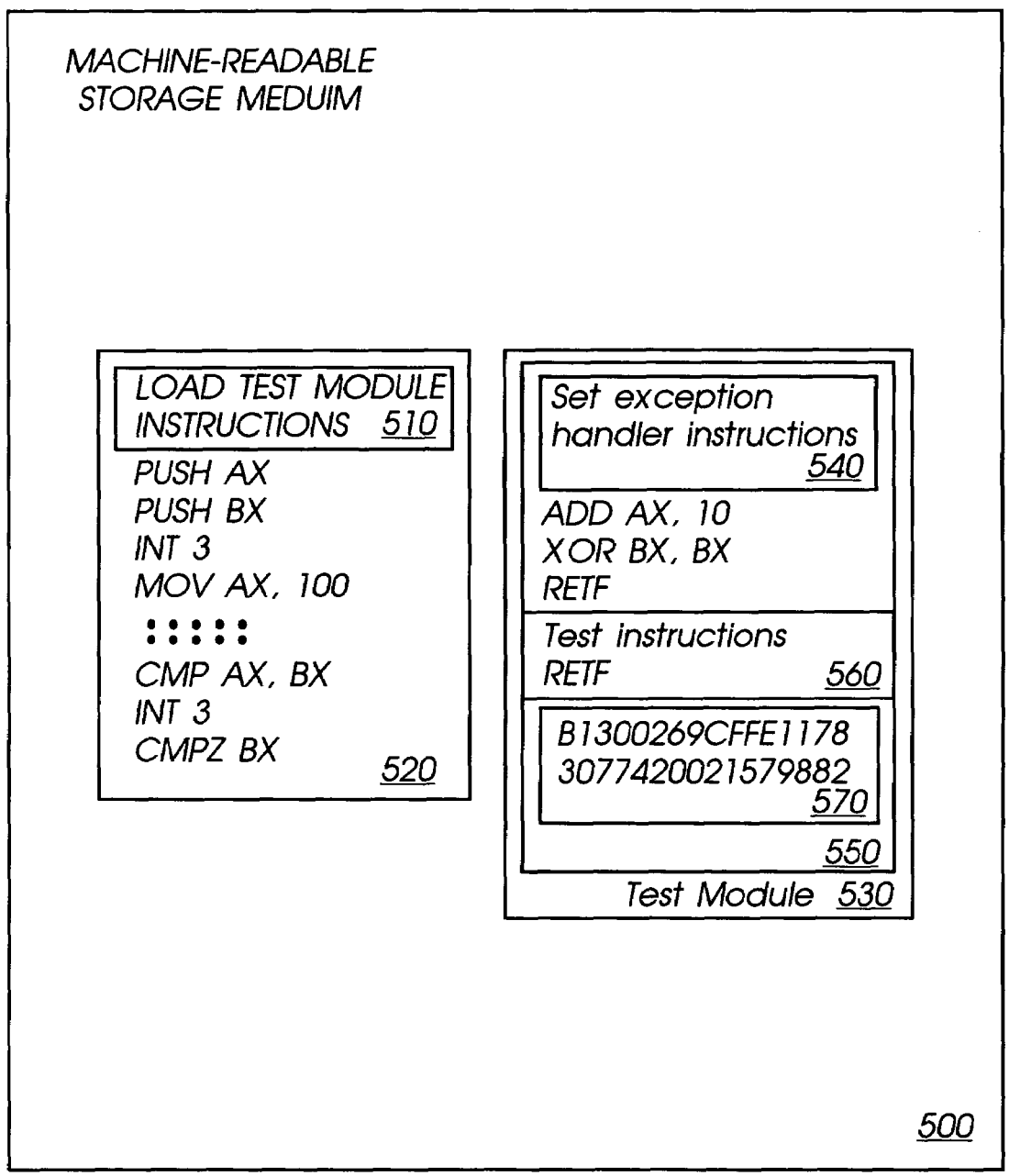
FIG. 5 is a schematic diagram illustrating an embodiment of a machine-readable medium comprising an embodiment of a post-processed sequence of instructions in accordance with the present invention.

FIG. 5 is a schematic diagram illustrating an embodiment of a machine-readable medium comprising an embodiment of a post processed sequence of instructions 520 in accordance with the present invention. Referring now to FIG. 5, a sequence of instructions 520 to test includes instructions 510 to load an associated test module 530. The associated test module 530 may comprise an initialization section 550 comprising instructions 540 to set an exception handler identifying test instructions 560 as the target of the INT instructions comprised by instructions 520. Section 550 may further comprise instructions (ADD, XOR) relocated from the sequence 520 to make room for the load instructions 510. Test instructions 560 may perform a test on sequence 520 and when the result of the test indicates execution may proceed, the test module 530 may reference an encrypted target address table 570 to determine the target address to invoke for this invocation of the test module 530.

In summary, embodiments of an instruction sequence post-processor have been disclosed with advantages over prior implementations. In one embodiment, selected instructions of the instruction sequence to test may be replaced with instructions to transfer control to a test module. The test module may be associated with the sequence to test by including instructions in the sequence to test which load the test module when the sequence to test is loaded and executed. The test module may include an encrypted target address table which identifies which target addresses to call for associated addresses from which control was transferred to the test module. When the test module is invoked from the sequence of instructions to test, the test module may perform a test and if the test result permits execution to proceed, may call the target address corresponding to the address from which the test module was invoked.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
   generating a software test module to produce a test result by performing a test on instructions;
   identifying a first instruction in a sequence of instructions, the first instruction comprising a target address and invoking a function or procedure,
   replacing the first instruction with a second non-identical instruction to transfer control to the test module, the second instruction comprising fewer bytes than the first instruction;
   compacting the instructions to eliminate a hole created by replacing the first instruction with the second instruction; and
   storing the target address encrypted in a table, the test module to locate the target address in the table and to set an execution address to the target address if test results indicates the instructions are to proceed.

2. The method of claim 1 further comprising:
   corresponding the target address with the instruction address in the encrypted table.

3. The method of claim 1 further comprising:
   profiling the instructions to identify the first instruction as an instruction to replace.

4. A device comprising:
a processor;
a machine-readable storage medium coupled to the processor by way of a bus, the storage medium having stored thereon instructions which, when executed by the processor, cause the data processing device to:
generate a software test module, the test module to produce a test result by performing a test on the instructions;
identify a first instruction in a sequence of instructions, the first instruction comprising a target address and invoking a function or procedure;
replace the first instruction a second non-identical instruction to transfer control to the test module, the second instruction comprising fewer bytes than the first instruction;
compact the instructions to eliminate a hole created by replacing the first instruction with the second instruction; and
store the target address in an encrypted table, the test module to locate the target address in the table and to transfer control to the target address if test results indicates the instructions are to proceed.

5. The device of claim 4 in which the instructions, when executed by the processor, further cause the device to:
corresponding the target address with the instruction address in the encrypted table.

6. The device of claim 4 in which the instructions, when executed by the processor, further cause the device to:
profile the instructions to identify the first instruction as an instruction to replace.

7. An article comprising:
a machine-readable medium having stored thereon instructions which, when executed by a data processing device, cause the data processing device to:
generating a software test module to produce a test result by performing a test on the instructions;
identify a first instruction in a sequence of instructions, the first instruction comprising a target address and invoking a function or procedure;
in the instructions, replace a first instruction with a second non-identical instruction to transfer control to the test module, the second instruction comprising fewer bytes than the first instruction;
compact the instructions to eliminate a hole created by replacing the first instruction with the second instruction; and
store the target address in an encrypted table, the test module to locate the target address in the table and to transfer control to the target address if test results indicates the instructions are to proceed.

8. The article of claim 7 in which the instructions, when executed by a data processing device, further cause the data processing device to:
correspond the target address with the instruction address in the encrypted table.

9. The article of claim 7 in which the instructions, when executed by a data processing device, further cause the data processing device to:
profile the instructions to identify the first instruction as an instruction to replace.

10. An article comprising:
a machine-readable medium having stored thereon:
instructions which, when executed by a data processing device, cause the data processing device to:
transfer control to a software test module when a second instruction having an instruction address in the instructions is executed by the data processing device, the second instruction replacing a non-identical first instruction comprising a target address, the first instruction to invoke a function or procedure, and the first instruction comprising more bytes than the second instruction the software test module comprising
a table to store the target address of the replaced first instruction; and
test instructions to produce a test result by performing a test on the instructions, the test module to locate the target address in the table and to transfer control to the target address if the test result indicates the instructions are to proceed.

11. The article of claim 10 in which the instructions further comprise instructions to load the test module.

12. The article of claim 11 in which the test module further comprises:
instructions moved from the instructions, the instructions moved to make room in the instructions for the instructions to load the test module.

13. The article of claim 10 in which the test module further comprises instructions to set an exception handler to transfer control to the test instructions when the second instruction is executed by the data processing device.

* * * * *